Aug. 20, 1968  H. J. LITTLEHALES ETAL  3,397,843
FUEL NOZZLES
Filed Nov. 8, 1966  2 Sheets-Sheet 1
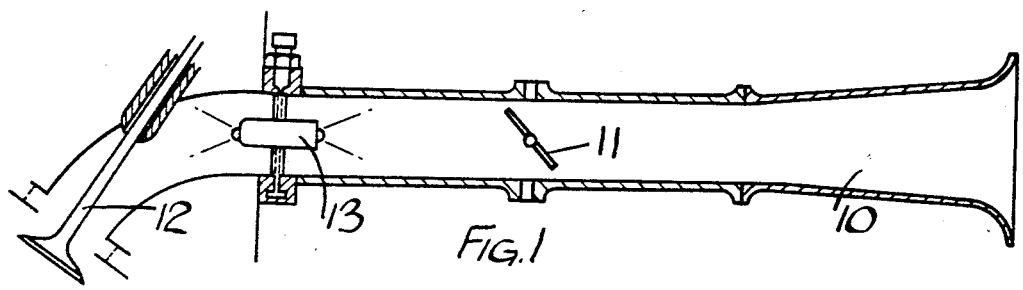
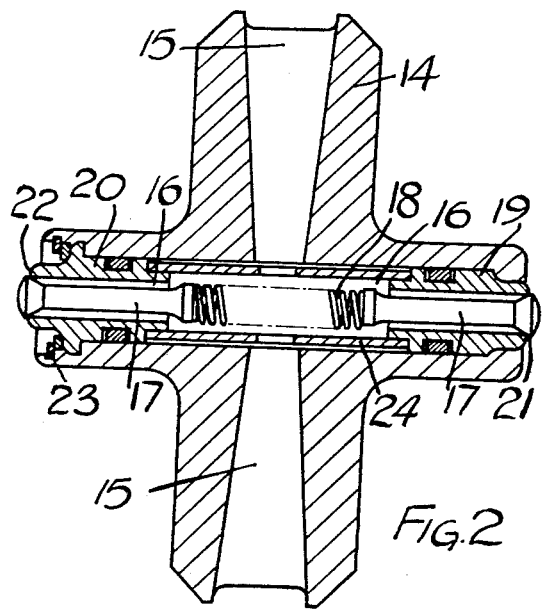
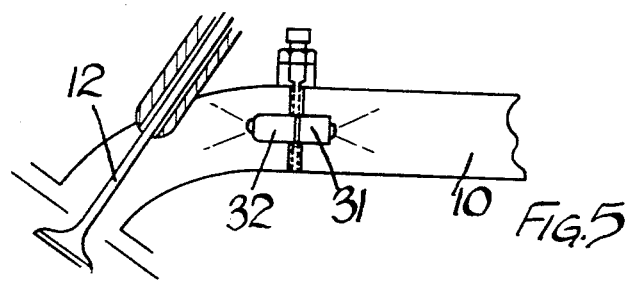

з,397,843
FUEL NOZZLES
Herbert James Littlehales, Sutton Coldfield, and Peter Birch, Birmingham, England, assignors to Joseph Lucas (Industries) Limited, Birmingham, England, a British company
Filed Nov. 8, 1966, Ser. No. 592,898
4 Claims. (Cl. 239—453)

This invention relates to fuel nozzles which are suitable for positioning in the induction manifold of an internal combustion engine.

The object of the invention is to provide a nozzle in a convenient form.

According to the present invention, fuel nozzle means for use in an induction manifold of an internal combustion engine, comprises means providing a pair of passages intended to be mounted with their outlet ends directed in upstream and downstream directions respectively within the manifold, the inlet ends of the passages being adapted for the supply of fuel thereto under pressure, and closure members in the outlet ends of the passages respectively, said closure members being biased towards positions to close the outlet ends of the passages respectively.

Figure 3:
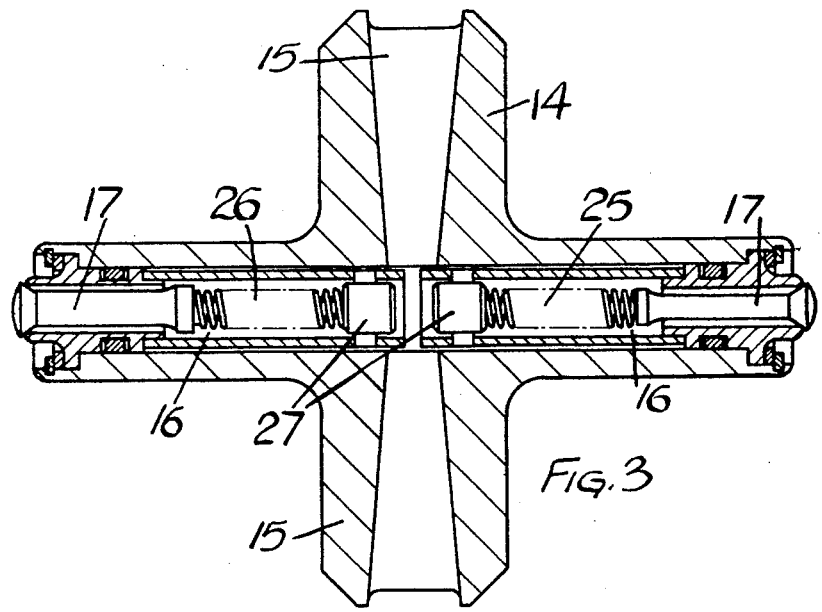
Figure 4:
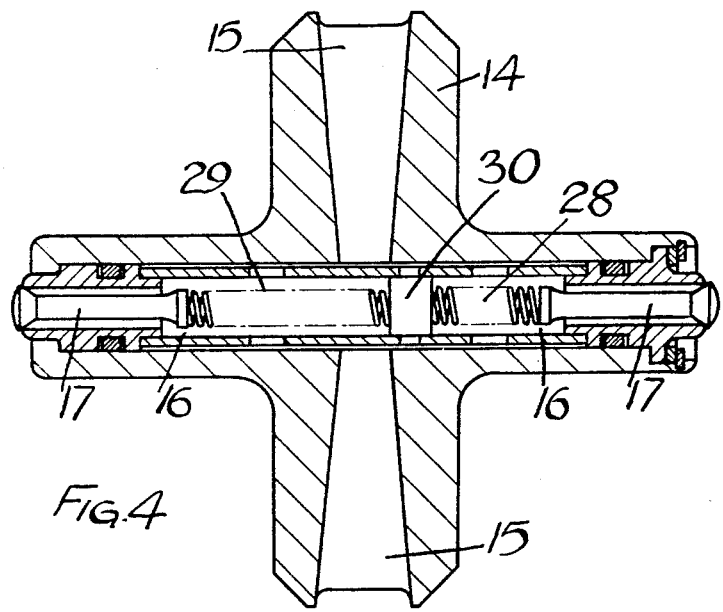

The invention will now be described by way of example with reference to the accompanying drawings in which:

FIGURE 1 is a diagrammatic representation of an induction manifold of an internal combustion engine to which the invention is applied, FIGURE 2 is a cross-sectional view on an enlarged scale of a particular form of fuel nozzle constructed in accordance with the present invention, FIGURES 3 and 4 are similar cross-sectional views sohwing alternative fuel nozzles, and FIGURE 5 shows an alternative arrangement within an engine manifold.

Referring to FIGURE 1 the invention is applied to the induction manifold of an internal combustion engine which includes a pipe 10 through which air can enter the engine, this pipe containing a manually controlled throttle. The induction manifold is connected to an engine in which is provided an inlet valve indicated at 12 to a combustion chamber in the engine (not shown).

The engine is supplied with liquid fuel at timed intervals through a nozzle assembly indicated generally at 13 in FIGURE 1, from associated injection equipment (not shown) which includes a pump and a metering device whereby measured quantities of fuel can be supplied at intervals related to engine speed.

One form of nozzle assembly is illustrated in FIGURE 2 in which there is a body 14 in which are formed a pair of inlet chambers 15, to which fuel under pressure can be supplied, these chambers 15 both communicating with a pair of passages 16 having their outlet ends directed in upstream and downstream directions with respect to the manifold when in a position of use respectively. Within the passages 16 are disposed closure members 17 arranged to close the outlet ends of the passages 16 respectively, these two closure members 17 being joined by a coiled tension spring 18, tending to urge the closure members towards positions in which they close the outlet ends of the passages 16 respectively.

The body 14 is tubular with a pair of radial arms in which the inlet chambers 15 are respectively defined, and these serve to support the portion of the body in which the passages 16 are defined.

There are two sleeves 19 and 20 in the outlet ends of the passages 16, these sleeves having seatings 21, 22 respectively against which heads of the closure members 17 abut respectively. The sleeve 20 is held in place in a recess in the body 14 by means of a circlip 23 and by detaching this circlip 23 this sleeve followed by a further sleeve 24 and the sleeve 19 together with the closure members 17 and spring 18 can be detached from the body 14.

It will be clear that in use when fuel is supplied to the inlet ends of the passages 16, the pressure of this fuel will serve to lift the closure members 17 off their seatings 21, 22 thus delivering quantities of fuel in both upstream and downstream directions.

In FIGURES 3 and 4 similar parts have been identified by similar reference numerals and it will be seen that this construction differs from that shown in FIGURE 2, in that there are two springs 25, 26 each being connected at its outer end to a closure member 17 and at its inner end to a fixed abutment member 27. Moreover, in this arrangement the closrue members 17 are of differing sizes so that a greater quantity of fuel will be delivered in one direction than is delivered in the other direction, the differential areas of the ends of the closure members 17 ensuring the proportion of fuel delivered in each direction.

The construction shown in FIGURE 4 has a pair of springs 28, 29 the inner ends of which are connected to a single abutment member 30 which as illustrated is positioned nearer to the outlet end of the passages 16 than to the other. This arrangement also ensures that differing quantities of fuel are delivered from opposite ends of the nozzle.

It will be realised that there are other ways in which the quantities of fuel delivered in opposite directions can be varied, and furthermore it will also be appreciated that other forms of nozzles can be provided though in all cases there will be two closure members independently operable and normally biased towards positions in which they close the outlet ends of the passages respectively.

As shown in FIGURE 5 an alternative arrangement has separate nozzles 31, 32 mounted within the inlet manifold directly within the air entry pipe 10, or alternatively within the side of the passage at an inclined angle so as to discharge in generally upstream and downstream directions, but obliquely with respect to the direction of flow of air through the passages. The separate nozzles may, if desired, be spaced apart by a substantial distance and furthermore, one of them may be arranged to provide a larger flow than the other.

With any one of these arrangments It will be appreciated that fuel can be delivered in both upstream and downstream directions simultaneously, the purpose of this being to supply a quantity in a downstream direction so that it reaches the engine combustion chamber as quickly as possible, though there has been found to be a tendency for this to result in relatively inefficient atomisation. Therefore the arrangement also enables a further quantity to be delivered in an upstream direction so that more effective atomisation of the latter quantity can take place.

Having thus described our invention what we claim as new and desire to secure by Letters Patent is:

1. Fuel nozzle means for use in an induction manifold of an internal combustion engine, comprising means providing a pair of passages intended to be mounted with their outlet ends directed in upstream and downstream directions respectively within the manifold, the inlet ends of the passages being adapted for the supply of fuel thereto under pressure, and closure members in the outlet ends of the passages respectively, said closure members being biased towards positions to close the outlet ends of the passages respectively.

2. Fuel nozzle means as claimed in claim 1 in which there is a body defining the pair of passages and also at least one inlet chamber for fuel, said inlet chamber being disposed substantially normally with respect to the lengths of the outlet passages which are coaxial.

3. Fuel nozzle means as claimed in claim 2 in which the body is tubular and has a pair of radial arms within, which are defined a pair of inlet chambers respectively.

4. Fuel nozzle means as claimed in claim 1 in which there are two separate nozzles disposed to discharge in opposite directions, the passages being formed in the separate nozzles respectively.

References Cited

UNITED STATES PATENTS

| | | | |
|---|---|---|---|
| 2,555,803 | 6/1951 | Mashinter et al. | 239—453 |
| 2,706,976 | 4/1955 | Gianini | 123—119 |

M. HENSON WOOD, JR., *Primary Examiner.*

M. MAR, *Assistant Examiner.*